(No Model.)
W. C. YOUNG.
CLOTHES LINE SUPPORT.
No. 325,470. Patented Sept. 1, 1885.
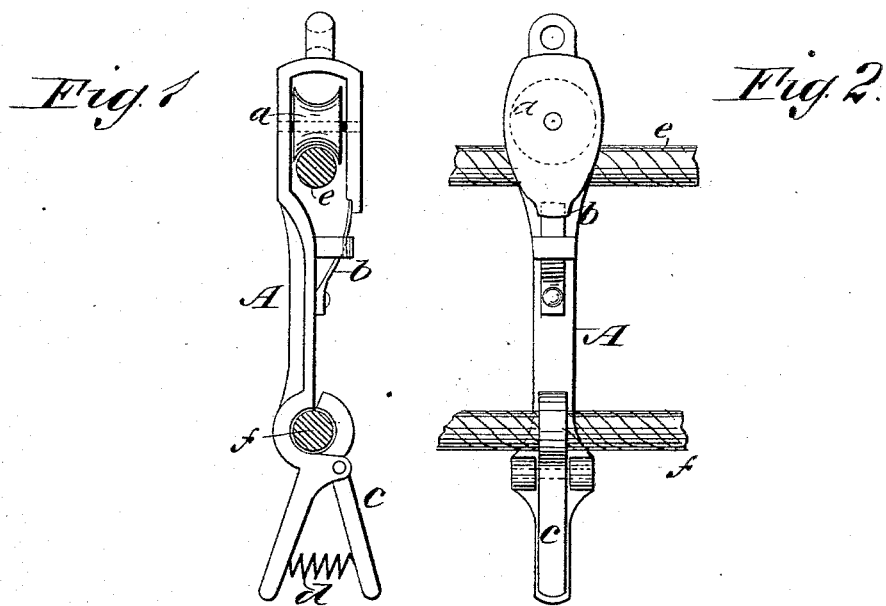

UNITED STATES PATENT OFFICE.

WILLIAM C. YOUNG, OF PATERSON, NEW JERSEY.

CLOTHES-LINE SUPPORT.

SPECIFICATION forming part of Letters Patent No. 325,470, dated September 1, 1885.

Application filed June 4, 1884. (No model.)

*To all whom it may concern:*

Be it known that I, WILLIAM C. YOUNG, of Paterson, in the county of Passaic and State of New Jersey, have invented a new and useful Improvement in Clothes-Line Supports, of which the following is a full, clear, and exact description.

My invention relates to supports used with running clothes-lines to prevent the weight on the lower part of the line from sagging it down; and it consists in a novel construction having the object to make the device more reliable and convenient in use, as hereinafter described and claimed.

Reference is to be had to the accompanying drawings, forming a part of this specification, in which similar letters of reference indicate corresponding parts in both figures.

Figure 1 is a side view of my improved clothes-line support, and Fig. 2 is a face view of the same.

The whole device is to be made of malleable iron and galvanized. The bar A, forming the main portion, has its upper end bent to form a snap-hook, for receiving a roller, *a*, and the upper line. A flat spring, *b*, allows insertion of the line and prevents accidental disconnection of the supporter. The lower end of bar A is curved, and has pivoted to it a lever, *c*, that forms a spring-clip closed by a spring, *d*, between its outer end and the end of bar A, so as to clamp the lower portion of the line firmly.

The device is to be hung by its roller end on the upper part of the clothes-line represented at *e*, and the lower line, *f*, clipped by lever *c*. The supporter thus placed will retain its position on the lower line while traveling on the upper portion as the line is drawn back and forth. This keeps the two parts of the line at a uniform distance apart, supporting the lower line from the upper, as usual with these articles, and, in addition, the supporters will not run together and against the clothes, as is always the case when the supporters are loose on both lines.

The device may be made of any suitable material.

Having thus described my invention, I claim as new and desire to secure by Letters Patent—

In a clothes-line support, the bar with its hooked roller end, which receives a clothes-line, provided with a spring-hook to confine the line in the hook at said end of the bar, and having the curved lower end, the curved spring-pressed lever pivoted to the bar to fasten the bar to a second clothes-line, substantially as and for the purpose set forth.

WILLIAM C. YOUNG.

Witnesses:
 ARCHIBALD G. BIBBY,
 ROBERT LANNING.